United States Patent Office 3,090,759
Patented May 21, 1963

3,090,759
PROCESS FOR BREAKING EMULSIONS OF THE OIL-IN-WATER CLASS
Fred W. Jenkins, Los Angeles, Calif., assignor to Petrolite Corporation, Wilmington, Del., a corporation of Delaware
No Drawing. Filed Dec. 4, 1958, Ser. No. 778,055
10 Claims. (Cl. 252—344)

This invention relates to a process for resolving or separating emulsions of the oil-in-water class, by subjecting the emulsion to the action of certain chemical reagents.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, in the manufacture of butadiene tar-in-water emulsions, in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions, in synthetic rubber plants; synthetic latex-in-water emulsions, in plants producing copolymer butadiene-styrene or GR–S synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficulty recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrates the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of these emulsions of the oil-in-water class which contain a minor proportion of dispersed phase, ranging from 20% down to a few parts per million. Emulsions containing more than about 20% of dispersed phase are commonly of such stability as to be less responsive to the presently disclosed reagents, possibly because of the appreciable content of emulsifying agent present in such systems, whether intentionally incorporated for the purpose of stabilizing them, or not.

Although the present invention relates to emulsions containing as much as 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures, in which the composition of the emulsion and its ingredients is known. In many instances, however, the emulsions to be resolved are either naturally-occurring or accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention comprises subjecting an emulsion of the oil-in-water class to the action of a reagent or demulsifier of the kind subsequently described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

In general, the reagents employed as demulsifiers are olefinic polymers, for example vinyl polymers, containing acrylamide groups as monomeric units in the polymeric structure. Thus, the demulsifiers are polymers, primarily linear, containing monomeric units having formula (I)
$$-CH_2-CR- \\ \;\;\;\;\;\;\;\;\;\;\;| \\ \;\;\;\;\;\;\;\;\;\;\;C=O \\ \;\;\;\;\;\;\;\;\;\;\;| \\ \;\;\;\;\;\;\;\;\;\;\;NH_2$$

(wherein R is hydrogen or alkyl, for example methyl, ethyl, etc.) which monomeric units (I) comprise at least about 40 mole percent, for example about 40 to 100 mole percent but preferably about 60 to 100% of the total polymer.

These polymers have an average molecular weight of at least about 40,000, for example about 40,000 to several million, but preferably about 50,000 to 1,000,000 but may have as high a molecular weight as is possible to attain. However, these polymers should be sufficiently water soluble or dispersible (i.e. for true-solution or colloidal solutions) when present in the aqueous media in the small proportions specified herein.

Although acrylamide or methacrylamide homopolymers are preferably employed wherein all or substantially all of the monomeric units are derived from acrylamide, methacrylamide, etc., copolymers thereof can also be employed. In general, these copolymers can be produced by copolymerizing acrylamide or methacrylamide, etc. with one or more other ethylenically unsaturated copolymerizable substances containing a

group, wherein the $R_1$, $R_2$, $R_3$, and $R_4$ groups are hydrogen, halogen (i.e. chlorine, bromine, iodine, fluorine), alkyl, cycloalkyl, aryl, etc. radicals containing functional groups for example

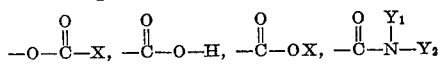

etc. wherein X is a hydrocarbon radical, preferably alkyl, and $Y_1$ is hydrogen or a hydrocarbon radical preferably alkyl, and $Y_2$ is a hydrocarbon radical preferably alkyl.

In those instances where the comonomer is of a type which tends to form hydrophobic polymers, the proportion of such comonomers should not be so large as to produce a copolymer which is not sufficiently water-soluble or dispersible in the system.

Examples of suitable comonomers are given in the following table:

TABLE I

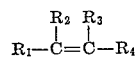

| Ex. | $R_1$ | $R_2$ | $R_3$ | $R_4$ |
|---|---|---|---|---|
| 1 | H | H | H | $-O\overset{O}{\overset{\|}{C}}-CH_3$ |
| 2 | H | H | H | Cl |
| 3 | H | H | H | —CN |
| 4 | H | H | $CH_3$ | —CN |
| 5 | H | H | H | —COOH |
| 6 | H | H | $CH_3$ | —COOH |
| 7 | H | H | H | —⌬ |
| 8 | H | H | H | H |
| 9 | $CH_3$ | H | H | H |
| 10 | F | F | F | F |
| 11 | Cl | F | F | F |
| 12 | H | H | H | COOR (R=1-18 carbons) |
| 13 | H | H | $CH_3$ | COOR (R=1-18 carbons) |
| 14 | H | H | H | $-\overset{O}{\overset{\|}{C}}-\overset{H}{\overset{\|}{N}}-R$ (R=1-18 carbons) |
| 15 | H | H | H | $-\overset{O}{\overset{\|}{C}}-\overset{R}{\overset{\|}{N}}-R$ (R=1-18 carbons) |
| 16 | Cl | H | H | Cl |
| 17 | Br | H | H | Br |
| 18 | Cl | Cl | Cl | Cl |
| 19 | Br | Br | Br | Br |
| 20 | Cl | F | F | Cl |
| 21 | H | H | H | $-CH=CH_2$ |
| 22 | Cl | H | Cl | Cl |
| 23 | Br | H | Br | Br |

In addition, these copolymers may be random copolymers or they may be reacted in an alternate fashion to form block or graft copolymers and the like. They also include terpolymers or higher copolymers polymerized randomly or in a block-wise fashion.

The preferred reagent employed in this invention is homopolymerized acrylamide having a molecular weight of at least 40,000, for example 40,000 to several million, but preferably 50,000 to 1,000,000.

The reagents employed in the practice of my process are sufficiently water-dispersible under the conditions of use as to be miscible with the external phase of the emulsions which are to be resolved. All such emulsions are of the oil-in-water class; and hence they have water, some aqueous liquid, or at least some non-oily liquid as such external phase. Miscibility of the reagent with such phase, in the proportions required, is important if the reagent is to distribute itself throughout the emulsion in such manner as to resolve the latter.

The present reagents are useful because they are able to recover the oil from oil-in-water class emulsions at a low cost and in some instances they have been found to resolve emulsions which were not economically or effectively reasonable by any other known means.

The material may be employed in the solid form, or it may be diluted with a suitable solvent. Water has been found to constitute a satisfactory solvent, because of its ready availability at a negligible cost; but in other cases suitable non-aqueous solvents have been employed in preparing reagents which were effective when used for the purpose of resolving oil-in-water emulsions. Because such reagents are frequently effective in proportions of the order of 10 to 50 parts per million, their solubility in the emulsion mixture may be entirely different from their apparent solubility in bulk, in water or oil. Undoubtedly, they have some solubility in both media, within the concentration range employed.

In operating the present process to resolve an oil-in-water emulsion, the reagent is introduced at any convenient point in the system, and it is mixed with the emulsion in any desired manner, such as by being pumped or circulated through the system or by mechanical agitation such as paddles, or by gas agitation. After mixing, the mixture of emulsion and reagent is allowed to stand quiescent until the constituent phases of the emulsion separate. Settling times and optimum mixing times will, of course, vary with the nature of the emulsions and the apparatus available. The operation, in its broadest concept, is simply the introduction of the reagent into the emulsion, the mixing of the two to establish contact and promote coalescence, and, usually, the subsequent quiescent settling of the agitated mixture, to produce the aqueous and non-aqueous emulsion phases as stratified layers.

Agitation may be achieved in various ways. The piping system through which the emulsion is passed during processing may itself supply sufficient turbulence to achieve adequate mixing of reagent and emulsion. Baffled pipe may be inserted in the flow sheet to provide agitation. Oother devices such as perforated-chamber mixers, excelsior- or mineral- or gravel- or steel-shaving-packed tanks, beds of stones or gravel or minerals in open ducts or trenches may be employed beneficially to provide mixing. The introduction of a gas, such as natural gas or air, into a tank or pipe in which or through which the mixture of reagent and emulsion is standing or passing is frequently found suitable to provide desired agitation.

It has been found that the factors, reagent feed rate, agitation and settling time are somewhat inter-related. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

Application of a suitable gas in a procedure approximating that of the froth flotation cell employed in ore beneficiation, after the present reagent has been added to the emulsion to be resolved, frequently has a favorable influence of totally unexpected magnitude. By incorporating the step of subjecting the chemicalized emulsion to the action of air in a sub-aeration type flotation cell, a clear aqueous layer is sometimes obtained in a matter of seconds, without added quiescent settling, and with approximately as much reagent as used in a companion test in which no agitation was used. Such companion test separated a clear aqueous layer only after standing quiescent for hours. Natural gas was found to be as good a gaseous medium as was air in this operation.

It should be distinctly understood that such aeration technique, while an important adjunct to the use of the present reagent, in some cases, is not an equivalent procedure. This may be proved by subjecting an un-chemicalized emulsion to aeration for a period of minutes without detectable favorable effect. Addition of the reagent to such aerated emulsion will produce resolution, promptly.

The details of the mechanical structures required to produce aeration suitable for the present purpose need not be given here. It is sufficient to state that any means capable of producing small gas bubbles within the body of the emulsion is acceptable for use.

The flotation principle has long been employed in the beneficiation of ores. Many patents in this art illustrate apparatus suitable for producing aeration of liquids. Reference is made to Taggart's "Handbook of Ore Dressing," which describes a large number of such devices.

The principle of aeration has been applied to the resolution of emulsions by Broadbridge, in U.S. Patent No. 1,505,944, and Bailey, in U.S. Patent No. 1,770,476. Neither of these patents discloses or suggests the present invention, as may be seen from an inspection of their contents.

Suitable aeration is sometimes obtainable by use of the principle of Elmore, U.S. Patent No. 826,411. In that ore beneficiation process, an ore pulp was passed through a vacuum apparatus, the application of vacuum liberating very small gas bubbles from solution in the water of the pulp, to float the mineral. A more recent application of this same principle is found in the Dorr "Vacuator."

The order in which the reagent and the aeration step are applied is relatively immaterial. Sometimes it is more convenient to chemicalize the emulsion and subsequently to apply the aeration technique. In others, it may be more advantageous to produce a strongly frothing emulsion and then introduce the reagent into such aerated emulsion.

As stated previously, any desired gas can be substituted for air. Other commonly suitable gases include natural gas, nitrogen, carbon dioxide, oxygen, etc., the gas being used essentially for its levitation effect. If any gas has some deleterious effect on any component of the emulsion, it will obviously be desirable to use instead some other gas which is inert under the conditions of use.

Although heat is ordinarily of little importance in resolving oil-in-water class emulsions with my reagents, there are some instances where heat is a useful adjunct. This is especially true where the viscosity of the continuous phase of the emulsion is appreciably higher than that of water.

In some instances, importantly improved results are obtained by adjusting the pH of the emulsion to be treated, to an experimentally determined optimum value.

The reagent feed rate also has an optimum range, which is sufficiently wide, however, to meet the tolerances required for the variances encountered daily in commercial operations. A large excess of reagent can produce distinctly unfavorable results.

My reagents may be employed alone, or they may in some instances be employed to advantage admixed with other compatible oil-in-water demulsifiers. Specifically, I have found that they may be advantageously admixed with the reagents disclosed in U.S. Patents Nos. 2,470,829 and 2,589,198 through 2,589,201.

My process is commonly practiced simply by introducing small proportions of the reagent into an oil-in-water class emulsion, agitating to secure distribution of the reagent and incipient coalescence, and letting the mixture stand until the oil phase separates. The proportion of reagent required will vary with the character of the emulsion to be resolved. Ordinarily, proportions of reagent required are from about 1 p.p.m. to about 500 p.p.m. the volume of emulsion treated, but more or less may be required in specific instances. Preferably from about 10 p.p.m. to 100 p.p.m. is employed.

A preferred method of practicing the process to resolve a petroleum oil-in-water emulsion is as follows: Flow the oil well fluids, consisting of free oil, oil-in-water emulsion, and natural gas, through a conventional gas separator, then to a conventional steel oil-field tank, of, for example, 5,000-bbl. capacity. In this tank the oil-in-water emulsion falls to the bottom, is withdrawn, and is so separated from the free oil. The oil-in-water emulsion, so withdrawn, is subjected to the action of the reagent in the desired small proportion, injection of reagent into the stream of oil-in-water emulsion being accomplished by means of a conventional proportioning pump or chemical feeder. The proportion employed in any instance is determined by trial-and-error. The mixture of emulsion and reagent then flows to a pond or sump wherein it remains quiescent and the previously emulsified oil separates, rises to the surface and is removed. The separated water, containing relatively little to substantially none of the previously emulsified oil, is thereafter discarded.

*Example 1*

Acrylamide (51.8 parts) is dissolved in 414.7 parts of distilled water and warmed to about 58° C. with stirring under an atmosphere of carbon dioxide. Thereupon 7.76 parts of isopropyl alcohol and 0.096 part of potassium persulfate are added. The mixture is then stirred at 75–80° C. for about two hours. The polyacrylamide reaction product is a clear, colorless solution having a viscosity of about 3,500 cps. at 25° C.

Various commercial polyacrylamide of varying molecular weights are also employed in the process, for example those produced by American Cyanamid such as PAM 50, PAM 75, PAM 100. These are described in American Cyanamid New Product Bulletin No. 34—"Polyacrylamide."

Although the above polyacrylamides are the preferred embodiment, various polyacrylamide copolymers which are water dispersible can be employed in the process. In general, the water dispersible copolymers contain acrylamide as about 50 mole percent of the copolymer, but preferably above 75% or more of the polymer, for example copolymers of acrylamide and the other monomers shown in Table I.

The following examples illustrate the breaking of petroleum oil-in-water emulsions.

*Example 2*

An oil-in-water emulsion produced from an oil from the Coalinga Nose oil field in California is subjected to the action of a reagent prepared according to Example 1. In this test a series of three bottles of the emulsion are treated with the reagent in amounts of 14, 7, 3½ parts per million of emulsion. A commercial oil-in-water demulsifier is run as a control test and at the same amounts as the described reagent. After sufficient agitation in the form of 150 back-and-forth strokes the test is set aside for observation. At the end of three hours it is noted that all bottles of the described reagent have produced a clear water with a film of oil floating on the top, while none of the bottles containing the commercial oil-in-water demulsifying reagent have produced any clear water layer.

*Example 3*

A similar test with an oil-in-water emulsion produced from an oil from the Edison field in California is treated in an identical manner as the above-mentioned emulsion is except that four bottles of each series contained respectively 35, 17.5, 8.2 and 4.1 parts per million. The bottles are agitated as above and set aside for observation. It is noted that after three hours standing the described reagents produce clearer water than did the bottles containing the commercially available demulsifying reagent.

The following examples illustrate the use of the present reagents in breaking oil-in-water emulsions in other systems.

In a butadiene manufacturing operation, employing heavy petroleum naphthas as raw material and a conventional gas-making plant, the wash box circulating water becomes badly fouled with the butadiene tar and residual oils from the gas-making operation. In such condition it constitutes a distinctly unsatisfactory medium. Its odor is so intense and its content of oily constituents so strongly stain-producing, that abandonment of use is contemplated. Application of polyacrylamide results in resolution of the emulsion, and the recovery of clear water.

In another plant, butylene is passed over a catalyst bed along with steam and a hydrocarbon oil, for the purpose of producing butadiene by dehydrogenation of the butylene. Condensation of the steam in the presence of the oil causes the formation of an oil-in-water emulsion. Addition of the polyacrylamide produces a substantially complete stratification of oil and a transparent aqueous layer containing only several p.p.m. oil.

An oil-in-water emulsion comprising petroleum wax, hexane, and water occurs in the de-waxing of petroleum distillates by means of hexane. Such an emulsion is subjected to a small proportion of polyacrylamide with consequent resolution of the emulsion and production of a clear aqueous layer.

Steam cylinder emulsions produced in the lubrication of steam-actuated engines and pumps is subjected to the action of the present reagent, employing very small proportions of polyacrylamide with favorable results. The water separates in a clear aqueous layer, in such procedures.

In a plant producing GRS-type synthetic rubber by co-polymerizing butadiene and styrene, it is found that decanter water in the styrene system carried small proportions of styrene, emulsified in such water. Application of a minute proportion of polyacrylamide resolves such emulsions satisfactorily, clear water being obtained.

Synthetic latex emulsions are passed to waste in the same co-polymer plant when water is used to flush working areas, the waste water being exceedingly milky in appearance because of the presence of dispersed particles of synthetic rubber latex. Introduction of a small proportion of polyacrylamide into the emulsion produces a clear water effluent.

The cooling water systems of two natural gasoline absorption plants comprises dilute emulsions of absorption oil-in-water, at the time polyacrylamide is applied in small proportions to such emulsions. Complete resolution of the emulsions, with the production of oil and a clear aqueous layer, results from such application of such reagent, in both instances.

Several examples of emulsion in which oily materials are dispersed in the diethyleneglycol used to dehydrate natural gas are subjected to polyacrylamide. The emulsified materials form a bottom layer within several hours, the supernatant glycol being clear and bright, showing its freedom from dispersed particles. Settling is appreciably accelerated by the application of heat, since diethyleneglycol has an appreciable viscosity.

A dilute furniture polish emulsion, when subjected to polyacrylamide is resolved into a clear aqueous layer and an oily top layer. The original emulsion contains petroleum hydrocarbon oil and an emulsifier of unknown composition.

A pipe press water, obtained in the manufacture of clay pipe in a steam-actuated press, carries a minor proportion of oil and some clay. Subjection to a small proportion of polyacrylamide resolves the emulsion system, and produces a clear aqueous layer.

A dilute dispersion of a commercial emulsified resin paint is subjected to the action of the polyacrylamide. The opaque milky emulsion separates a clear aqueous layer, in a short time, although only very small proportions of demulsifier is used.

Having thus described my invention, what I claim as new and desire to obtain by Letters Patent is

1. A process for breaking an emulsion comprising an oil dispersed in a non-oily continuous phase in which the dispersed phase is not greater than about 20%, characterized by subjecting the emulsion to the action of a reagent containing a water dispersible polymer having a major amount of

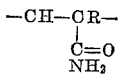

units and having a molecular weight of at least about 40,000, wherein R is a member selected from the group consisting of hydrogen and lower alkyl.

2. The process of claim 1 where the emulsion is a petroleum oil-in-water emulsion.

3. A process for breaking an emulsion comprising an oil dispersed in a non-oily continuous phase in which the dispersed phase is not greater than about 20%, characterized by subjecting the emulsion to the reaction of a reagent containing a water dispersible homopolymer selected from the group consisting of polyacrylamide and polymethacrylamide and having a molecular weight of at least 40,000.

4. The process of claim 3 where the emulsion is a petroleum oil-in-water emulsion.

5. The process of claim 4 where the homopolymer is polyacrylamide.

6. A process for breaking an emulsion comprising an oil dispersed in a non-oily continuous phase in which the dispersed phase is not greater than about 1% characterized by subjecting the emulsion to the action of a reagent containing a water dispersible polymer having a major amount of

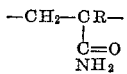

units and having a molecular weight of at least about 40,000 wherein R is a member selected from the group consisting of hydrogen and lower alkyl.

7. The process of claim 6 where the emulsion is a petroleum oil-in-water emulsion.

8. A process for breaking an emulsion comprising an oil dispersed in a non-oily continuous phase in which the dispersed phase is not greater than about 1%, characterized by subjecting the emulsion to the action of a reagent containing a water dispersible homopolymer selected from the group consisting of polyacrylamide and polymethacrylamide and having a molecular weight of at least about 40,000.

9. The process of claim 8 where the emulsion is a petroleum oil-in-water emulsion.

10. The process of claim 9 where the homopolymer is polyacrylamide.

References Cited in the file of this patent

UNITED STATES PATENTS

| | | |
|---|---|---|
| 2,407,895 | Monson et al. | Sept. 17, 1946 |
| 2,589,199 | Monson | Mar. 11, 1952 |
| 2,589,200 | Monson | Mar. 11, 1952 |
| 2,589,201 | Monson | Mar. 11, 1952 |

FOREIGN PATENTS

| | | |
|---|---|---|
| 761,021 | Great Britain | Nov. 7, 1956 |
| 851,549 | France | Oct. 2, 1939 |
| 64,477 | Denmark | May 13, 1946 |

OTHER REFERENCES

Michaels: Aggregation of Suspensions by Polyelectrolytes, article in Ind. and Eng. Chem., vol. 46, pp. 1485–1490, July 1954.